United States Patent
Makinen et al.

(10) Patent No.: US 10,772,003 B2
(45) Date of Patent: Sep. 8, 2020

(54) CONFIGURABLE MAPPING OF QUALITY OF SERVICE CLASSES

(71) Applicant: NOKIA SOLUTIONS AND NETWORKS OY, Espoo (FI)

(72) Inventors: Jarmo Tapani Makinen, Espoo (FI); Andrea Cattoni, Nibe (DK)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/082,883

(22) PCT Filed: Mar. 7, 2016

(86) PCT No.: PCT/EP2016/054774
§ 371 (c)(1),
(2) Date: Sep. 6, 2018

(87) PCT Pub. No.: WO2017/152936
PCT Pub. Date: Sep. 14, 2017

(65) Prior Publication Data
US 2019/0069195 A1    Feb. 28, 2019

(51) Int. Cl.
*H04W 72/10* (2009.01)
*H04W 28/02* (2009.01)
(Continued)

(52) U.S. Cl.
CPC ......... *H04W 28/0268* (2013.01); *H04L 47/24* (2013.01); *H04L 47/35* (2013.01);
(Continued)

(58) Field of Classification Search
CPC ............. H04W 28/0268; H04W 72/10; H04W 28/0273; H04W 80/02; H04W 80/08;
(Continued)

(56) References Cited

U.S. PATENT DOCUMENTS

2007/0133546 A1* 6/2007 Kim .................. H04L 47/35
                                                 370/392
2008/0049648 A1* 2/2008 Liu .................... H04L 65/80
                                                 370/310
(Continued)

FOREIGN PATENT DOCUMENTS

JP    H06276254 A    9/1994
WO   2012155756 A1   11/2012

OTHER PUBLICATIONS

Examination Report for European Application No. 16709007.5, dated Jun. 12, 2019, 4 pages.
(Continued)

*Primary Examiner* — Mohamed A Kamara
(74) *Attorney, Agent, or Firm* — Brake Hughes Bellermann LLP (57) ABSTRACT

Various communication systems may benefit from improved quality of service treatment in the access networks. For example, certain communication systems may benefit from a dynamic varying of the quality of service level of a data flow. A method may include detecting a requested quality of service level requirement at a new data flow or an existing data flow at a network entity. The method may also include retrieving from a table a needed parameter linked to the requested quality of service level. In addition, the method can include using the needed parameter to create a new processing instance or to update an existing processing instance at the network entity. A method may further include updating the content of the table through separate signaling.

17 Claims, 6 Drawing Sheets

(51) Int. Cl.
  *H04W 80/02* (2009.01)
  *H04L 12/801* (2013.01)
  *H04L 12/851* (2013.01)
  *H04L 12/709* (2013.01)
  *H04L 29/08* (2006.01)
  *H04W 80/08* (2009.01)

(52) U.S. Cl.
  CPC ....... *H04W 28/0273* (2013.01); *H04W 72/10* (2013.01); *H04W 80/02* (2013.01); *H04L 45/245* (2013.01); *H04L 67/322* (2013.01); *H04W 80/08* (2013.01)

(58) Field of Classification Search
  CPC ....... H04L 47/35; H04L 45/245; H04L 47/24; H04L 67/322
  See application file for complete search history.

(56) References Cited

U.S. PATENT DOCUMENTS

| | | |
|---|---|---|
| 2010/0178919 A1 | 7/2010 | Deepak et al. |
| 2013/0028223 A1 | 1/2013 | Kim et al. |
| 2014/0051423 A1* | 2/2014 | Marsden ................. H04W 4/50 455/419 |
| 2014/0198734 A1* | 7/2014 | Yamada ................. H04W 8/205 370/329 |
| 2014/0328288 A1* | 11/2014 | Lu ..................... H04W 72/1242 370/329 |
| 2014/0341017 A1 | 11/2014 | Mutikainen et al. |
| 2015/0003435 A1 | 1/2015 | Horn et al. |
| 2015/0281999 A1* | 10/2015 | Zhu ....................... H04W 28/12 370/329 |
| 2017/0127438 A1* | 5/2017 | Ludwig ................. H04W 28/24 |

OTHER PUBLICATIONS

3GPP TSG-RAN WG2 #92; Tdoc R2-156693; "Mapping Between QCIs and LBT Priority Classes"; Anaheim, California, USA; Nov. 16-20, 2015 (4 pages).

International Search Report and Written Opinion for International Application No. PCT/EP2016/054774, dated Jan. 3, 2017 (16 pages).

* cited by examiner

CONFIGURABLE MAPPING OF QUALITY OF SERVICE CLASSES

CROSS-REFERENCE TO RELATED APPLICATIONS

This application is a national stage entry of PCT Application No. PCT/EP2016/054774 filed Mar. 7, 2016, entitled "CONFIGURABLE MAPPING OF QUALITY OF SERVICE CLASSES" which is hereby incorporated by reference in its entirety.

BACKGROUND

Field

Various communication systems may benefit from improved quality of service treatment in mobile networks. For example, certain communication systems may benefit from a dynamic varying of the quality of service treatment of data flows.

Description of the Related Art

In telecommunication networks, such as $3^{rd}$ Generation Partnership Project (3GPP) technology, for example, Long Term Evolution (LTE), High Speed Packet Access (HSPA) network, or Wideband Code Division Multiple Access (WCDMA) network, quality of service (QoS) treatment of data is defined by QoS classes. QoS classification and corresponding treatment of data are tools for enabling a good Quality of Experience (QoE) for the user. Because different users consume different services at the same time, the requirements for the network delivery of data to each service, including capacity and latency, can be different. As a result of this difference, different QoS classes can be used for data flow to a given service. The QOS classes define how the data will be treated in different parts of the network, and act to ensure a sufficient QoE.

QoS class can be defined and signaled separately for each data flow, or marked into each individual data packet or data unit. To adjust the operation of different protocol layers and functions based on a QoS class, separate data tunnels, such as 3GPP bearers, are established through the network for each needed QoS class. Control plane signaling is then used to inform each protocol layer and network function how to treat each of these tunnels. Because the control signaling can be a slow process, each tunnel has a fixed QoS class.

When a need arises to change the QoS of a given data flow, the data flow is switched to another tunnel having the requisite QoS. To switch a data flow to a different tunnel, a new tunnel has to first exist, meaning that the tunnel often has to be set up first, which takes both time and resources. In addition, the receiving end of the tunnel has to be informed of the change in data flow, which also requires time and signaling resources.

Alternatively, there may be a fixed relation between the quality of service class and how each protocol layer or network function treats the data. The treatment of a data flow could change as soon as the protocol layer or network function learns about the new QoS class, and the control plane would not need to reconfigure each protocol layer or network function separately. However, the network operator may want to optimize the network by adjusting the treatment of individual data units, rather than changing the treatment of the entire protocol layer. Further, the optimum QoS parameters may vary in different parts of the network. A fixed mapping between the QoS class and data processing parameters does not take into account this network variation.

Another aspect involves accounting for the evolution of the network. When the network implementation, configuration, or features evolve, the optimum processing parameter can change. The change in configurations can even impact protocol layers and network functions outside the direct layer or network function, where the actual evolution step took place. Data processing parameters, in these locations or layers, also need to be adapted according to the changed configurations. A fixed mapping between the quality of service class and the data processing parameters in each layer and/or network function makes adjusting the data processing parameters difficult.

SUMMARY

According to certain embodiments, an apparatus may include at least one memory including computer program code, and at least one processor. The at least one memory and the computer program code may be configured, with the at least one processor, to cause the apparatus at least detect a requested quality of service level of a new data flow or an existing data flow at a network entity. The at least one memory and the computer program code may also be configured, with the at least one processor, to cause the apparatus at least to retrieve from a table a needed parameter linked to the requested quality of service level. In addition, the at least one memory and the computer program code may be configured, with at least one processor, to cause the apparatus to use the needed parameter to create a new processing instance or to update an existing processing instance at the network entity.

A method, in certain embodiments, may include detecting a requested quality of service level of a new data flow or an existing data flow at a network entity. The method may also include retrieving from a table a needed parameter linked to the requested quality of service level. In addition, the method can include using the needed parameter to create a new processing instance or to update an existing processing instance at the network entity.

An apparatus, in certain embodiments, may include means for detecting a requested quality of service level of a new data flow or an existing data flow at a network entity. The apparatus may also include means for retrieving from a table a needed parameter linked to the requested quality of service level. In addition, the apparatus may also include means for using the needed parameter to create a new processing instance or to update an existing processing instance at the network entity.

According to certain embodiments, a non-transitory computer-readable medium encoding instructions that, when executed in hardware, perform a process. The process may include detecting a requested quality of service level of a new data flow or an existing data flow at a network entity. The process may also include retrieving from a table a needed parameter linked to the requested quality of service level. In addition, the process may include using the needed parameter to create a new processing instance or to update an existing processing instance at the network entity.

According to certain other embodiments, a computer program product may encode instructions for performing a process. The process may include detecting a requested in required quality of service level of a new data flow or an existing data flow at a network entity. The process may also include retrieving from a table a needed parameter linked to the requested quality of service level. In addition, the process may include using the needed parameter to create a new processing instance or to update an existing processing instance at the network entity.

According to certain embodiments, an apparatus may include at least one memory including computer program code, and at least one processor. The at least one memory and the computer program code may be configured, with the at least one processor, to cause the apparatus at least to detect a requested quality of service level of a new data flow or an existing data flow at a user equipment. The at least one memory and the computer program code may also be configured, with the at least one processor, to cause the apparatus at least to retrieve from a table, at the user equipment, a needed parameter linked to the requested quality of service level. In addition, the at least one memory and the computer program code may be configured, with at least one processor, to cause the apparatus to mark an uplink data packet using a quality of service marking as detected in a downlink packet received by the user equipment, and send the uplink data packet to a network entity.

A method, in certain embodiments, may include detecting a requested quality of service level of a new data flow or an existing data flow at the user equipment at a user equipment. The method may also include retrieving from a table, at the user equipment, a needed parameter linked to the requested quality of service level. In addition, the method can include marking an uplink data packet using a quality of service marking as detected in a downlink data packet received by the user equipment, and sending the uplink data packet to a network entity.

An apparatus, in certain embodiments, may include means for detecting a requested quality of service level of a new data flow or an existing data flow at the user equipment at a user equipment. The apparatus may also include means for retrieving from a table, at the user equipment, a needed parameter linked to the requested quality of service level. In addition, the apparatus may also include means for marking an uplink data packet using a quality of service level marking as detected in a downlink data packet received by the user equipment, and means for sending the uplink data packet to a network entity.

According to certain embodiments, a non-transitory computer-readable medium encoding instructions that, when executed in hardware, perform a process. The process may include detecting a requested quality of service level of a new data flow or an existing data flow at the user equipment at a user equipment. The process may also include retrieving from a table, at the user equipment, a needed parameter linked to the requested quality of service level. In addition, the process may include marking an uplink data packet using a quality of service level marking as detected in a downlink data packet received by the user equipment, and sending the uplink data packet to a network entity.

According to certain other embodiments, a computer program product may encode instructions for performing a process. The process may include detecting a requested quality of service level of a new data flow or an existing data flow at the user equipment at a user equipment. The process may also include retrieving from a table, at the user equipment, a needed parameter linked to the requested quality of service level. In addition, the process may include marking an uplink data packet using a quality of service level marking as detected in a downlink data packet received by the user equipment, and sending the uplink data packet to a network entity.

BRIEF DESCRIPTION OF THE DRAWINGS

For proper understanding of the invention, reference should be made to the accompanying drawings, wherein.

DETAILED DESCRIPTION

The services and/or applications used by users in a telecommunication network, and the traffic needs of such services and/or applications, may vary dramatically. In order to provide a good QoE, or for other reasons, certain embodiments can allow for the treatment of data to vary dynamically in each data flow. For example, the QoS class of each data flow may be varied dynamically. Such embodiments may also be beneficial in a bearer-less network.

In certain embodiments, each layer or network function may, in some embodiments, be quickly re-configured based on changes in QoS class, indicated to a user equipment (UE) or a network entity by either a packet marking or a separate signal. The re-configuration may be based on a network operator's preferences, for example, a mobile network operator, that are expressed via a configurable look-up table. Certain embodiment may involve a mobile network, while other may involve any other type of telecommunication network. The look-up table may make it possible to change the mapping between QoS class and the needed parameters for data treatment when needed. In some embodiments, the control plane may not be involved in changing the QoS treatment of data flow.

How the table is used, and what format the table should take, may both be standardized. The table can include QoS parameters, and may have one or more default standardized parameter that can be modifiable by a network operator, for example, a mobile network operator (MNO). In certain embodiments, a mention of a single parameter should not be taken to exclude a set of parameters. The MNO may also apply a set of functions and messages for defining, manipulating, and updating the QoS parameters of the table. For example, a set of functions may be applied for determining how the QoS table may be used in prioritizing data traffic in run time. In run time may mean that the table is read in real time when there is user data, for which a new set of processing parameters are needed.

The QoS parameters can be defined in a table that links a QoS level and one or more parameter configuration for serving such a QoS level. The QoS parameter may be represented by a number and included as a bit field within a packet. In certain embodiments, the table may be included in both the UE and in at least one network entity. Each network entity or network node that processes a QoS specific sub-flows can look up the needed processing parameters from a table. The network entity may, for example, be a Packet Data Convergence Protocol (PDCP), a Radio Link Control (RLC), a Multi-Node Controller (MNC), which can host the PDCP, or a logical 5G base station including physical layer (PHY), Medium Access Control (MAC), a base station (NB). While the above entities are used in 4th generation mobile networks (4G), certain embodiments may include 5th generation mobile networks (5G) equivalent entities having some varying functionality.

While the parameter table may be standardized with default parameters, the MNO can have partial or full control over the definition of its own parameters. In some embodiments, therefore, the MNO may determine the parameters according to the MNO's criteria, such as network capabilities and subscription policies.

Figure 1:
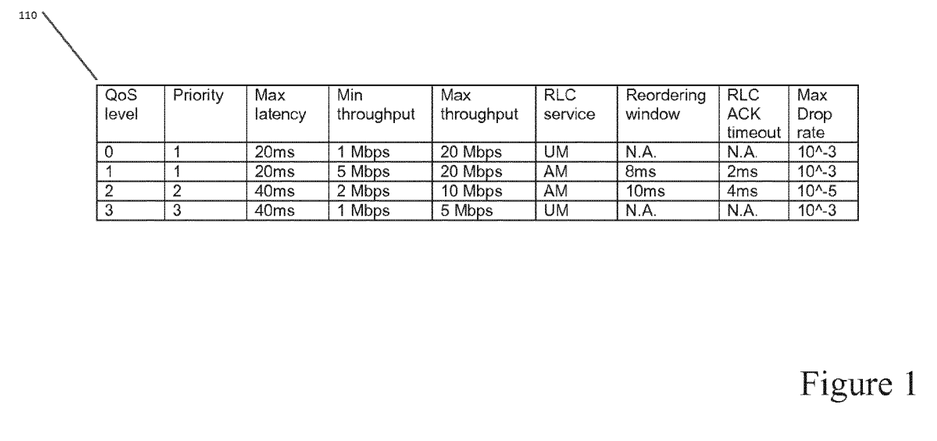
FIG. 1 illustrates a table according to certain embodiments.

FIG. 1 illustrates a table according to certain embodiments. Specifically, FIG. 1 illustrates a table that links a QoS class with parameters for data treatment of the QoS class. In the illustrated embodiment, table 110 includes a QoS level, and several data treatment parameters, such as priority, max latency, max throughput, RLC service, reordering window, RLC acknowledgment timeout, and max drop rate. Any other parameter relating to data treatment may also be included in the table. In some embodiments, the number of rows in the table can be determined by how many bits in the packet headers are reserved for the QoS marking. The number of bits may be either standardized or variable, depending on the embodiment. For example, a 1 Byte label, for example, may include 256 possible configurations, which in some embodiment may provide ample margins for defining proper configurations.

In QoS level 1, shown in table 110, the associated or linked priority may be 1, indicating a high priority level, while the max latency may be 20 milliseconds (ms), and the minimum throughput may be 5 megabytes per second (Mbps). The RLC service can be an acknowledge mode (AM). The RLC may have an AM, a transparent mode (TM), and/or an unacknowledged mode (UM). Other parameters of QoS level 1, as shown in table 110, include a reordering window, which may be 8 milliseconds, an RLC acknowledgement timeout that can be 2 milliseconds, and a max drop rate which can be one per thousand $10^{-3}$.

As discussed above, the table may initially be in a standardized form, at which point each MNO can update or personalize the table according to their own network criteria. The MNO may use control signaling or a control message, for example, radio resource control (RRC) signaling, to distribute the updates to the table to both the network and to the attached UEs. The table in the UE may be written every time the UE attaches to the network. On the network side, the original table can be written when they are taken into use by the network operator.

One way to update the table, in certain embodiments, may be to use a subscriber identity module (SIM) update message. This message can provide updates to the table whenever the network is updated globally. The SIM may be used for the general basic table configuration, which may be used for table changes that are needed on a long-term basis. Other methods may also be used for the general basic table configuration. On the network side, if both the QoS controlling/marking system and the network layers below it are from the same vendor, a new parameter or column may be added as a network upgrade.

Short-term basis changes, on the other hand, may also be needed to perform dynamic optimization and improve the QoE. Short-term changes may include location and load dependent table updates, which may be used to adjust a value of a given parameter in the table. Short-term configuration can be triggered, in certain embodiments, by an attach procedure performed by a bootstrapping UE. In other embodiments, short-term configuration may be triggered by the UE being handed over to an area where the network configuration is different. In other words, a handover can trigger the short-term configuration of the UE.

In certain embodiments, the specific configuration of the different areas of the network may involve a self-organizing network (SON). In such embodiments, a SON may be used to monitor the performance of the UEs and the network, and to update the different table configurations of each network entity, such as a NB or MNC.

As discussed above, the table may be updated through an RRC message, that is sent by a MNO to a network entity, for example, a NB or MNC, and forwarded to a UE. The RRC message in certain embodiments may take the form of an RRC_QOS_UPDATE message. In some embodiments, the message may contain only the information to be updated. For example, the minimum throughput for QoS level 1 may be changed from 5 Mbps to another value. In another embodiment, the message may contain the entire line that is updated. For example, the entire QoS level 1 parameters, including the updated parameters, may be contained in the message. In yet another embodiments, the entire table may be updated.

When the UE is located in an area to be controlled by an MNC, the message may include a copy of at least part of the table into the management entity, for example, a light weight NB (IwNB) in which the PDCP layer can be removed from the NB.

In certain embodiments, when the operator is updating the look-up table, there may be a need to synchronize the table on both the network side and the UE. The need for synchronization may depend on the nature of the entries in the table. In embodiments in which synchronization is needed, a sub-service flow specific trigger bit can be inserted into one or more sub-service flow packet headers. The sub-service flow packet may be a data packet being sent across the sub-service flow. Alternatively, a special trigger packet can be sent through the data path. The synchronization bit or trigger packet may be used to indicate that the updated look-up table should be used for data processing. The updated look-up table may be used by the network and/or the UE anytime after the network entity or the UE receives the synchronization bit or trigger packet. In some embodiments, the control plane is not used in triggering the synchronization of the table.

In certain embodiments, the new tables, or updates to the tables, may first be distributed to the relevant nodes. The relevant nodes may temporarily store both the old table and the new table, but continue to use the old tables. Once the tables have been properly distributed to all or some of the relevant nodes, a packet marking function can be told to add the trigger bit to the next packet marking, or alternatively a special trigger packet is sent. Once the layers below receive the packet having the trigger bit or the special trigger packet, the new tables or the updates may be used.

Figure 2:
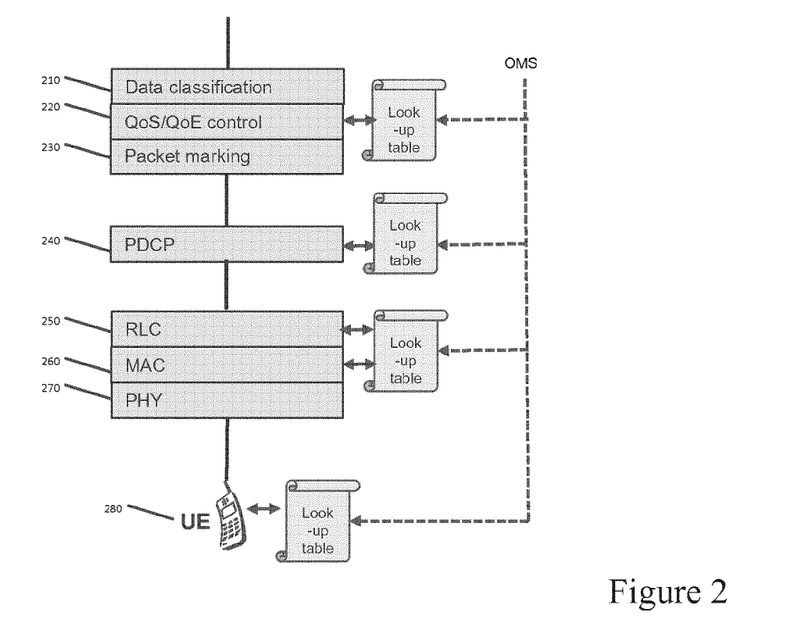
FIG. 2 illustrates an architecture according to certain embodiments.

FIG. 2 represents an architecture according to certain embodiments. An operation and management system (OMS) or any other QoE/QoS control system may be used to write and/or update the look-up table. In certain embodiments, data may be classified or arranged into sub-flows, in step 210, by using the sub-flow ID in the packet header, so that all data in one sub-flow can have a similar QoS level. In step 220, a network entity may then determine the correct QoS class for each sub-flow using the look-up table as a reference. Once the QoS class has been determined, a QoS class marking may be added to the header to each packet, as shown in step 230.

In step 240, PDCP may read the QoS class marking on the packet headers of each sub-flow, and retrieve new processing parameters from the corresponding look up tables. Other network layers, such as RLC, in step 250, medium access control (MAC), in step 260, and physical layer (PHY), in step 270, may undergo a similar process. As such, each layer may read the QoS class marking on the packet headers of each sub-flow, and retrieve new processing parameters from the corresponding look up tables. In step 280, the UE reads the QoS class marking on the packet headers of each flow, and can retrieve the required processing parameters from its own look-up table. The UE may then mark uplink packets of each sub-flow with the same QoS marking as received in the downlink. In certain embodiments, a change in the QoS marking in the packet header can mean that new processing parameters should be fetched from the table.

As shown in FIG. 2, the table can be used for creating and setting up processing steps in each layer, when a data packet of the new sub-flow, including the new sub-flow ID in the header, enters a network layer. The QoS parameter table can also, in some embodiments, be used in the context of dynamic QoS updates.

Figure 3:
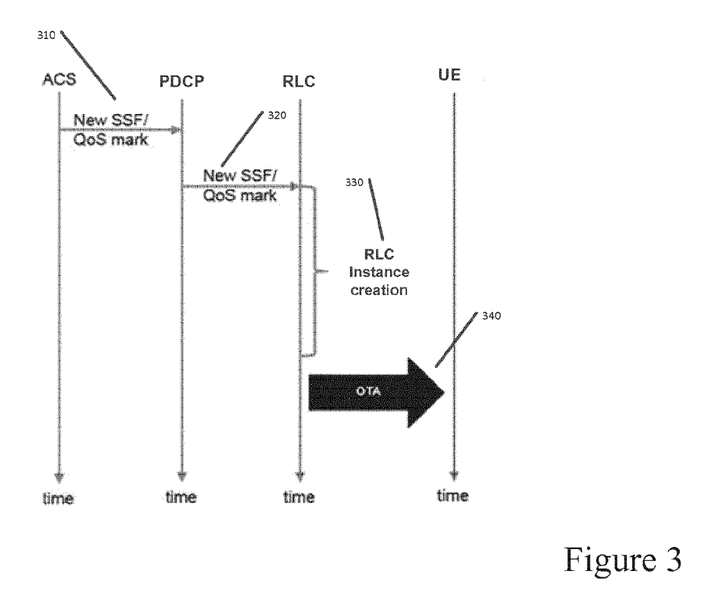
FIG. 3 illustrates a signal flow diagram according to certain embodiments.

FIG. 3 illustrates a signal flow diagram according to certain embodiments. Specifically, FIG. 2 illustrates a downlink transmission from the network to the UE. In step 310, a network entity, for example an Application Scheduler (ACS), may identify the presence of the new sub-service flow (SSF). Sub-service flow is a packet data flow that can be encapsulated to lower layer PDUs, when the packet travels towards an air interface. The markings for sub-flow ID and QoS class are inherited from higher layer headers to lower layer headers and vice versa, and are readable at each layer.

According to the already existing mark, for example, IP DiffServ or Ethernet class of service (CoS), the ACS may identify which QoS level, and which QoS label is required for signaling the needed QoS level to other network entities and/or network layers, such as PDCP or RLC. The ACS then notifies another network entity, for example, a PDCP, about the new SSF with relative configuration. The QoS marking may be an index, or line number, in the look-up table that defines the QoS class. QoS marking and sub-flow ID can be inserted to the packet headers of each protocol layer. In other words, the QoS marking is inherited or moved from the higher layer packet header to the lower layer packet header, and vice versa in the opposite direction.

In step 320, a network entity, such as a PDCP, may take the information received from the ACS and search the QoS parameter table in order to perform the proper multi-connectivity routing. In an embodiment involving 5G multi-connectivity, as described by FIG. 3, the QoS table can be used to select the best data route when more than one route is available. For example, the PDCP may have access to a table, as shown in FIG. 1. The PDCP may then use the table to look up the minimum throughput of the needed QoS level, as indicated by the new SSF. In certain embodiments, the PDCP may also take into account the drop rate needed by the new SSF. The PDCP can then decide on which to send the data packet on one particular radio leg, rather than another leg available in the multi-connectivity set. In another embodiment, the PDCP may decide to duplicate the packet on multiple legs due to the robustness of a multi-connectivity network.

The PDCP can then pass along the information about the QoS level through a specific QoS field contained, for example, in the header of the NCS protocol data unit (PDU). The packet may be exchanged with or sent to the RLC, in step 320, through a flow protocol, for example, the PDCP flow protocol (PDCP-FP), which may dictate the interface between the PDCP and the RLC. When the PDCP and RLC lay apart, the PDCP-FP may be used to connect the PDCP and RLC through an IP network.

Once the packet reaches the receiving end of the PDCP-FP, such as an RLC, the new SSF can be identified. The PDCP-FP may dynamically, and in real-time, trigger the creation of an RLC instance 330. The RLC instance can be configured by reading the parameters in the available QoS table. In certain embodiments, once the RLC instance is configured, the lower layer procedures, for example, MAC and PHY, may remain unchanged. A processing instance, such as an RLC instance, for example, may include one or more functionalities used to process a certain sub flow. For example, one of these functionalities may include queuing. Another example of a processing instance may include ARQ re-transmissions. In certain embodiments, there can be one queue per sub flow in RLC, and the ends of these queues may be exposed to the MAC layer for scheduling the packets over an air interface.

The message including information of the RLC instance may then be sent to the UE, as shown in step 340. The UE may read the RLC identification from the received message. If a new identification is present, the UE may dynamically instantiate the needed RLC entity by using the parameters stored in the available QoS table. In certain embodiments, this procedure may be similar, in part, to Proximity Services in LTE Release 12. However, the UE in certain embodiments is able to dynamically set the proper parameters by using the QoS field present in the RLC PDU header.

While the embodiment of FIG. 3 illustrates a downlink procedure, certain embodiments may also be used in an uplink procedure. In an uplink procedure, the UE may set the proper QoS level using the values of the QoS parameter table. The UE may then use such values when deciding how to fill up the transport blocks that are being transmitted to a network entity. Furthermore, the UE may mark the uplink packets of each sub-flow with the same QoS marking as received in the downlink.

In an embodiment in which the UE initiates new traffic, the UE may first use some default QoS class when transmitting the data traffic to a network entity. Once the network has determined the correct QoS class, and used that in the corresponding downlink transmission to the UE, the UE may then copy the Qos marking received from the downlink transmission, and include the marking during uplink transmissions. The network may then use the received transport blocks from the UE to dynamically instantiate the needed RLC entities, and configure them accordingly. This can allow for the synchronization of the QoS table in both the UE side and the network side. On the other hand, in an embodiment in which the traffic is initiated on the network side, the network side already knows what QoS class the UE should be using.

In addition, while the embodiment of FIG. 3 involves the creation of a new SSF, certain embodiments may apply to changing the treatment of an existing sub flow. In such embodiments, when a need to change the treatment of an existing sub flow is identified by a network entity, such as an ACS, the marking in the QoS field may be updated in the next packet. When the different layers in the network, for example, RLC, MAC, and PHY, or the UE detects a change in the QoS marking the layers and UE can update their behavior based on the parameters of the look-up table. As such, the treatment of data flowing through a layer or being used by a network service may be changed.

In certain embodiments, if there is queuing of sub-flow packets inside a layer, it may be best to monitor the QoS marking on the most recent packet in the queue. When a packet is leaving the queue, the packet can carry the most recent QoS marking of this sub-flow on the packet. The layer or the UE can therefore apply the retrieved processing parameters based on the most recent packet in the queue.

Figure 4:
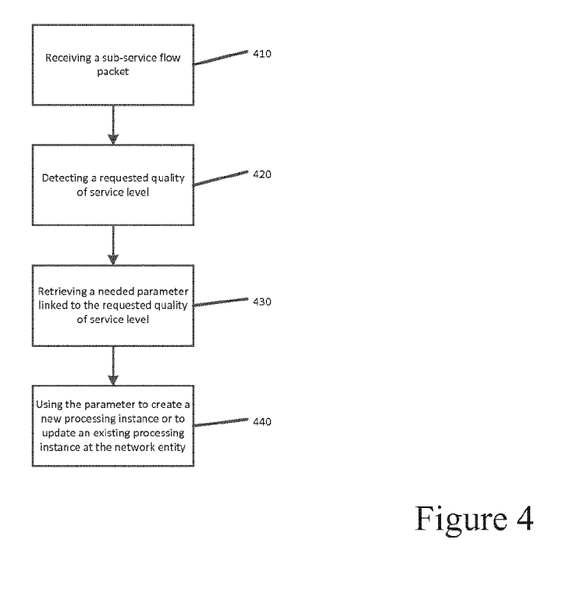
FIG. 4 illustrates a flow diagram according to certain embodiments.

FIG. 4 illustrates a flow diagram according to certain embodiments. In step 410, a network entity may receive a data flow packet, such as a sub-service flow packet. Depending on the marking in the header of the packet, which may include a requested QoS level for a new data flow, for example, a new sub-flow identification, or a requested QoS level for an existing data flow, for example, the network entity may detect a requested quality of service level may be needed, as shown in step 420. A change in the QoS marking in the packet headers can mean that new processing parameters should be fetched from the table. In certain embodiments, the network entity may detect a change in the quality of service of an existing data flow. Steps 310 and 330 of FIG. 3 illustrate a network entity receiving a sub-service flow packet.

In some embodiments, in step 430, once the network entity has detected a requested quality of service level, then it may proceed to retrieve a needed parameter linked to the requested quality of service level by using the table. In step 440, the network entity may use the needed linked parameter to create a new processing instance, as shown in step 330 of FIG. 3, or to update an existing processing instance, at the network entity.

Figure 5:
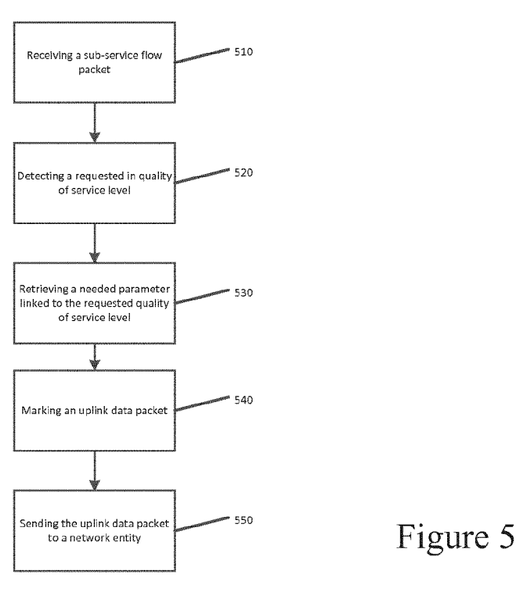
FIG. 5 illustrates a flow diagram according to certain embodiments.

FIG. 5 illustrates a flow diagram according to certain embodiments. The first several steps in FIG. 5 may be similar to steps 410-430 in FIG. 4. In step 510, a user equipment may receive a sub-service flow packet. In some embodiments, in step 520, the user equipment may detect a requested quality of service level of a new data flow or an existing data flow. The UE may then proceed to retrieve a needed parameter linked to the requested quality of service level by using the table, as shown in step 530 and process the data accordingly. In certain embodiments, the network entity may detect a change in the quality of service of an existing data flow.

In step 540, the user equipment can mark an uplink data packet of each sub-flow using the same QoS marking it has received in downlink. In other words, the UE may mark an uplink data packet using a QoS marking as detected in a downlink data packet received by the user equipment. In some embodiments the QoS marking may be indicative of the requested quality of service level of the new data flow or the existing data flow. The user equipment can then send the uplink data packet to a network entity, as shown in step 550. The network entity may use the needed linked parameter to create a new processing instance, as shown in step 330 of FIG. 3, or to update an existing processing instance, at the network entity.

Figure 6:
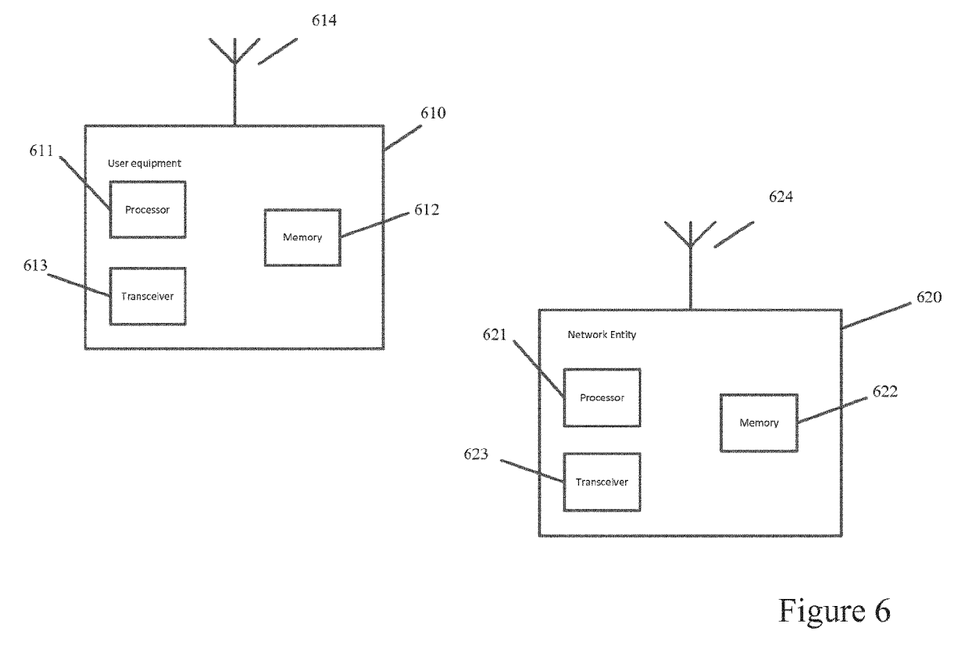
FIG. 6 illustrates a system diagram according to certain embodiments.

FIG. 6 illustrates a system according to certain embodiments. It should be understood that each block of the flowchart involved in FIGS. 2, 3, and 4, 5, or any combination thereof, may be implemented by various means or their combinations, such as hardware, software, firmware, one or more processors and/or circuitry. In one embodiment, a system may include several devices, such as, for example, network entity 620 or UE or user device 610. The system may include more than one UE 610 and more one network entity 620, although only one access node shown for the purposes of illustration. A network entity can be a network node, a base station, an NB, server, host, RLC, ACS, PDCP, RLC, or any of the other access or network node discussed herein.

Each of these devices may include at least one processor or control unit or module, respectively indicated as 611 and 621. At least one memory may be provided in each device, and indicated as 612 and 622, respectively. The memory may include computer program instructions or computer code contained therein. One or more transceiver 613 and 623 may be provided, and each device may also include an antenna, respectively illustrated as 614 and 624. Although only one antenna each is shown, many antennas and multiple antenna elements may be provided to each of the devices. Other configurations of these devices, for example, may be provided. For example, network entity 620 and UE 610 may be additionally configured for wired communication, in addition to wireless communication, and in such a case antennas 614 and 624 may illustrate any form of communication hardware, without being limited to merely an antenna.

Transceivers 613 and 623 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. The operations and functionalities may be performed in different entities, such as nodes, hosts or servers, in a flexible manner. In other words, division of labor may vary case by case. One possible use is to make a network node deliver local content. One or more functionalities may also be implemented as virtual application(s) in software that can run on a server.

A user device or user equipment 610 may be a mobile station (MS) such as a mobile phone or smart phone or multimedia device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof.

In some embodiment, an apparatus, such as an access node, may include means for carrying out embodiments described above in relation to FIGS. 2, 3, 4, and 5. In certain embodiments, at least one memory including computer program code can be configured to, with the at least one processor, cause the apparatus at least to perform any of the processes described herein.

According to certain embodiments, an apparatus 610 may include at least one memory 612 including computer program code, and at least one processor 611. The at least one memory 612 and the computer program code are configured, with the at least one processor 611, to cause the apparatus 610 at least to detect a requested quality of service level of a new data flow or an existing data flow at a user equipment, and retrieve from a table, at the user equipment, a needed parameter linked to the requested quality of service level. The at least one memory 612 and the computer program code are configured, with the at least one processor 611, to also cause the apparatus 610 at least to mark an uplink data packet using a QoS marking as detected in a downlink data packet received by the user equipment, and send the uplink data packet to a network entity.

According to certain embodiments, an apparatus 610 may include means for detecting a requested quality of service level of a new data flow or an existing data flow at a user equipment, and means for retrieving from a table, at the user equipment, a needed parameter linked to the requested quality of service class. The apparatus 610 may also include means for marking an uplink data packet using a QoS marking as detected in a downlink data packet received by the user equipment, and means for sending the uplink data packet to a network entity.

According to certain embodiments, an apparatus 620 may include at least one memory 622 including computer program code, and at least one processor 621. The at least one memory 622 and the computer program code are configured, with the at least one processor 621, to cause the apparatus 620 at least to detect a requested quality of service level of a new data flow or an existing data flow at a network entity, and retrieve from a table a needed parameter linked to the requested quality of service level. The at least one memory 622 and the computer program code are configured, with the at least one processor 621, to also cause the apparatus 620 at least to using the needed parameter to create a new processing instance or to update an existing processing instance at the network entity.

According to certain embodiments, an apparatus 620 may include means for detecting a requested quality of service level of a new data flow or an existing data flow at a network entity, and means for retrieving from a table a needed parameter linked to the requested quality of service level. The apparatus 620 may also include means for using the needed parameter to create a new processing instance or to update an existing processing instance at the network entity.

Processors 611 and 621 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors.

For firmware or software, the implementation may include modules or unit of at least one chip set (for example, procedures, functions, and so on). Memories 612 and 622 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network entity 620 or UE 610, to perform any of the processes described above (see, for example, FIGS. 2, 3, 4, and 5). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments may be performed entirely in hardware.

Furthermore, although FIG. 6 illustrates a system including a network entity 620 and UE 610, certain embodiments may be applicable to other configurations, and configurations involving additional elements, as illustrated and discussed herein. For example, multiple user equipment devices and multiple network entities may be present, or other nodes providing similar functionality, such as nodes that combine the functionality of a user equipment and a network entity, such as a relay node. The UE 610 may likewise be provided with a variety of configurations for communication other than communication network entity 620. For example, the UE 610 may be configured for device-to-device communication.

Certain embodiments allow for dynamically varying the QoS treatment at data flow in different layers and network services or functions. In some embodiments, a look-up table may help to facilitate this dynamic QoS treatment, which may allow for the QoS class and QoS treatment of data flow to be quickly changed. Both the network and the UE may have a look-up table, and may maintain synchronized tables.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the scope of the invention.

Partial Glossary

LTE Long Term Evolution
UE User Equipment
RRC Radio Resource Control
ACS Application Scheduler
PDCP Packet Data Convergence Protocol
PDCP-FP PDCP Frame Protocol
RLC Radio Link Control
PDU Protocol Data Unit
MNC Multi-Node Controller
NB Base Station for layers including PHY and PDCP
DL Downlink
UL Uplink
RAN Radio Access Network
QoS Quality of Service
QoE Quality of Experience

The invention claimed is:
1. A method, comprising:
detecting a requested quality of service level of a new data flow or an existing data flow at a network entity, an indication of the requested quality of service level embedded in a data flow packet;

retrieving from a table a parameter linked to the requested quality of service level; and using the parameter to create a new radio link layer processing instance or to update an existing radio link layer processing instance at the network entity.

2. The method according to claim 1, wherein the parameter is determined based on the table, wherein the table is configured to indicate the mapping between the quality of service and the parameter.

3. The method according to claim 1, further comprising:
receiving a control message from the network operator updating the parameter of the table.

4. The method according to claim 1, wherein the data flow packet comprises a packet header with a triggering bit configured to indicate that a new or updated table is taken into use.

5. The method according to claim 1, wherein the data flow packet comprises a triggering packet configured to indicate that a new or updated table is taken into use.

6. The method according to claim 1, further comprising:
receiving a data flow packet comprising a data identification configured to initiate the creating of the new processing instance.

7. The method according to claim 1, further comprising: performing multi-connectivity routing using the table.

8. A method, comprising:
detecting a requested quality of service level of a new data flow or an existing data flow at a user equipment, an indication of the requested quality of service level embedded in a data flow packet;

retrieving from a table, at the user equipment, a parameter linked to the requested quality of service level, the parameter is linked to the requested quality of service for a radio link layer;

marking an uplink data packet using a quality of service marking as detected in a downlink data packet received by the user equipment; and sending the uplink data packet to a network entity.

9. The method according to claim 8, wherein the uplink data packet triggers the creation of a new processing instance or an update of an existing processing instance in the network entity.

10. The method according to claim 8, wherein the table is configured to indicate the mapping between the quality of service and the parameter.

11. The method according to claim 8, further comprising:
receiving a control message from the network operator updating the parameter of the table.

12. The method according to claim 8, further comprising:
updating the table through a subscribe identity module update message.

13. The method according to claim 8, wherein the parameter comprises at least one of a priority class, maximum latency, minimum throughput, radio convergence sublayer service, reordering window, or maximum drop rate.

14. The method according to claim 8, further comprising:
receiving a change in a data flow packet quality of service marking to indicate that a new set of processing parameters are retrieved from the table.

15. The method according to claim 8, wherein the parameter is retrieved without control plane involvement.

16. An apparatus comprising:
at least one memory comprising computer program code;
at least one processor;
wherein the at least one memory and the computer program code are configured, with the at least one processor, to cause the apparatus at least to:
detect a requested quality of service level at a new data flow or an existing data flow at a network entity, an indication of the requested quality of service level embedded in a data flow packet;
retrieve from a table a parameter linked to the requested quality of service level; and
use the parameter to create a new radio link layer processing instance or to update an existing radio link layer processing instance at the network entity.

17. A non-transitory computer-readable medium encoding instructions that, when executed in hardware, perform a process according to claim 1.

* * * * *